(12) United States Patent
Abergel et al.

(10) Patent No.: US 9,090,058 B2
(45) Date of Patent: Jul. 28, 2015

(54) METHOD FOR CHECKING THE ALIGNMENT OF PRINT HEADS AND ASSOCIATED ALIGNMENT METHOD

(71) Applicant: MGI FRANCE, Ivry sur Seine (FR)

(72) Inventors: Edmond Abergel, Paris (FR); Romain Poncet, Ivry sur Seine (FR); Thierry Brionne, Ivry sur Seine (FR)

(73) Assignee: MGI FRANCE, Ivry sur Seine (FR)

( * ) Notice: Subject to any disclaimer, the term of this patent is extended or adjusted under 35 U.S.C. 154(b) by 0 days.

(21) Appl. No.: 14/398,170

(22) PCT Filed: May 2, 2013

(86) PCT No.: PCT/EP2013/059154
§ 371 (c)(1),
(2) Date: Oct. 31, 2014

(87) PCT Pub. No.: WO2013/164408
PCT Pub. Date: Nov. 7, 2013

(65) Prior Publication Data
US 2015/0085007 A1 Mar. 26, 2015

(30) Foreign Application Priority Data
May 3, 2012 (FR) .................................... 12 54068

(51) Int. Cl.
*B41J 2/045* (2006.01)
*B41J 2/15* (2006.01)
*G01B 11/27* (2006.01)

(52) U.S. Cl.
CPC ............. *B41J 2/04505* (2013.01); *G01B 11/27* (2013.01)

(58) Field of Classification Search
CPC .. B41J 2/2146; B41J 2/04505; B41J 2/04591; B41J 2/045; B41J 2/15; H04N 1/6041; H04N 2201/04787
USPC ............................... 347/14, 15, 19, 20, 40–43
See application file for complete search history.

(56) References Cited

U.S. PATENT DOCUMENTS

| 7,901,037 B2 * | 3/2011 | Walmsley et al. .............. 347/41 |
| 2004/0207674 A1 | 10/2004 | Otsuki |
| 2011/0007371 A1 | 1/2011 | Yip et al. |
| 2011/0169893 A1 | 7/2011 | Takafuji |

OTHER PUBLICATIONS

International Search Report for corresponding International Application No. PCT/EP2013/059154, mailed Aug. 6, 2013.

* cited by examiner

*Primary Examiner* — Thinh Nguyen
(74) *Attorney, Agent, or Firm* — Lowe Hauptman & Ham, LLP

(57) ABSTRACT

The aim of the present invention is to propose a method for assessing and correcting the alignment of print heads carried out using at least one linear adjustment algorithm, allowing greater accuracy in the use of same by eliminating inaccuracies linked to the ejection of drops from the print heads, while limiting the use of the resources of the IT system on which the method is used. Moreover, the number of print heads of which the alignment needs to be assessed and optionally corrected has very little influence on the overall processing time required by said method.

17 Claims, 7 Drawing Sheets

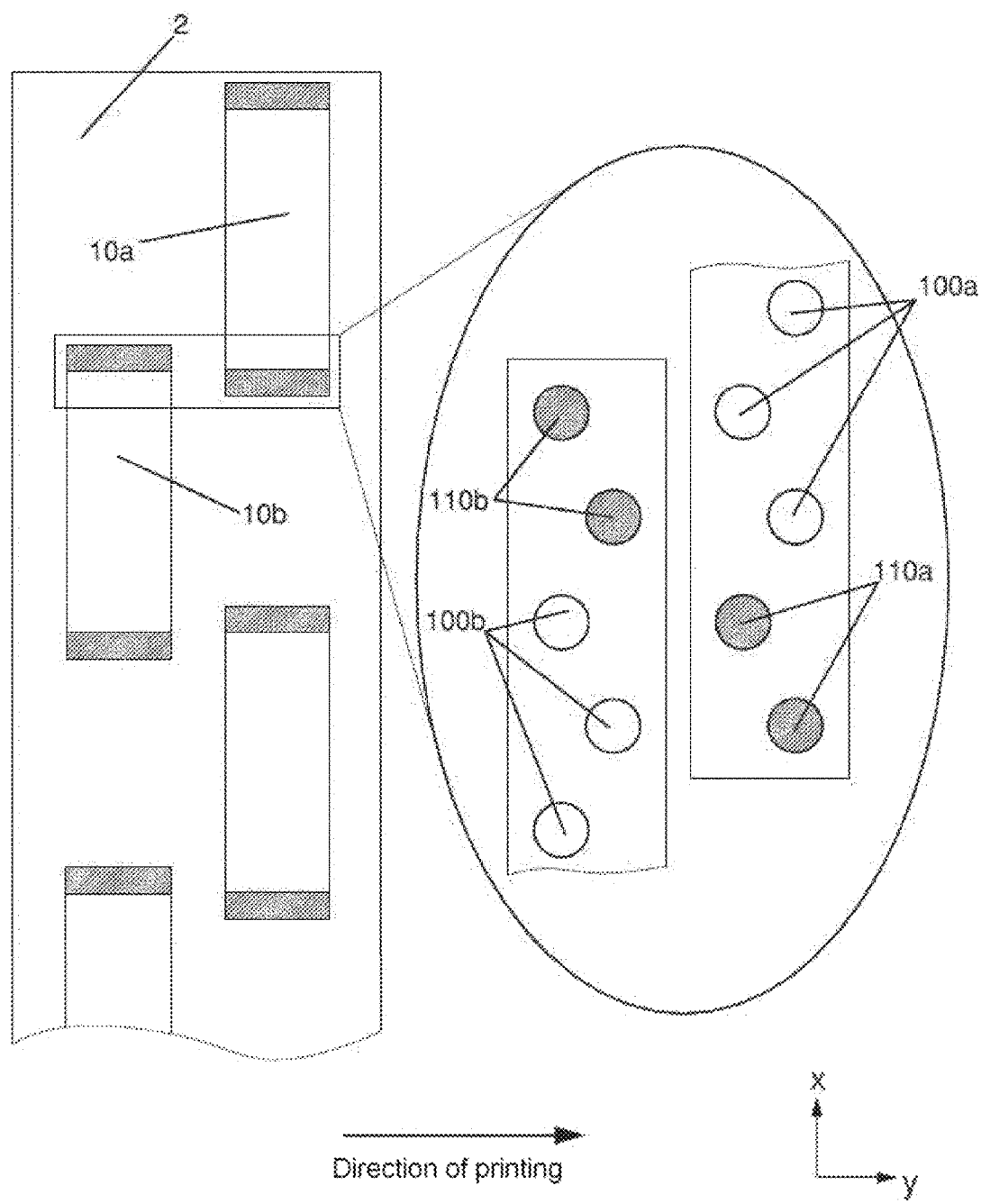

METHOD FOR CHECKING THE ALIGNMENT OF PRINT HEADS AND ASSOCIATED ALIGNMENT METHOD

TECHNICAL FIELD OF THE INVENTION

Figure 1:
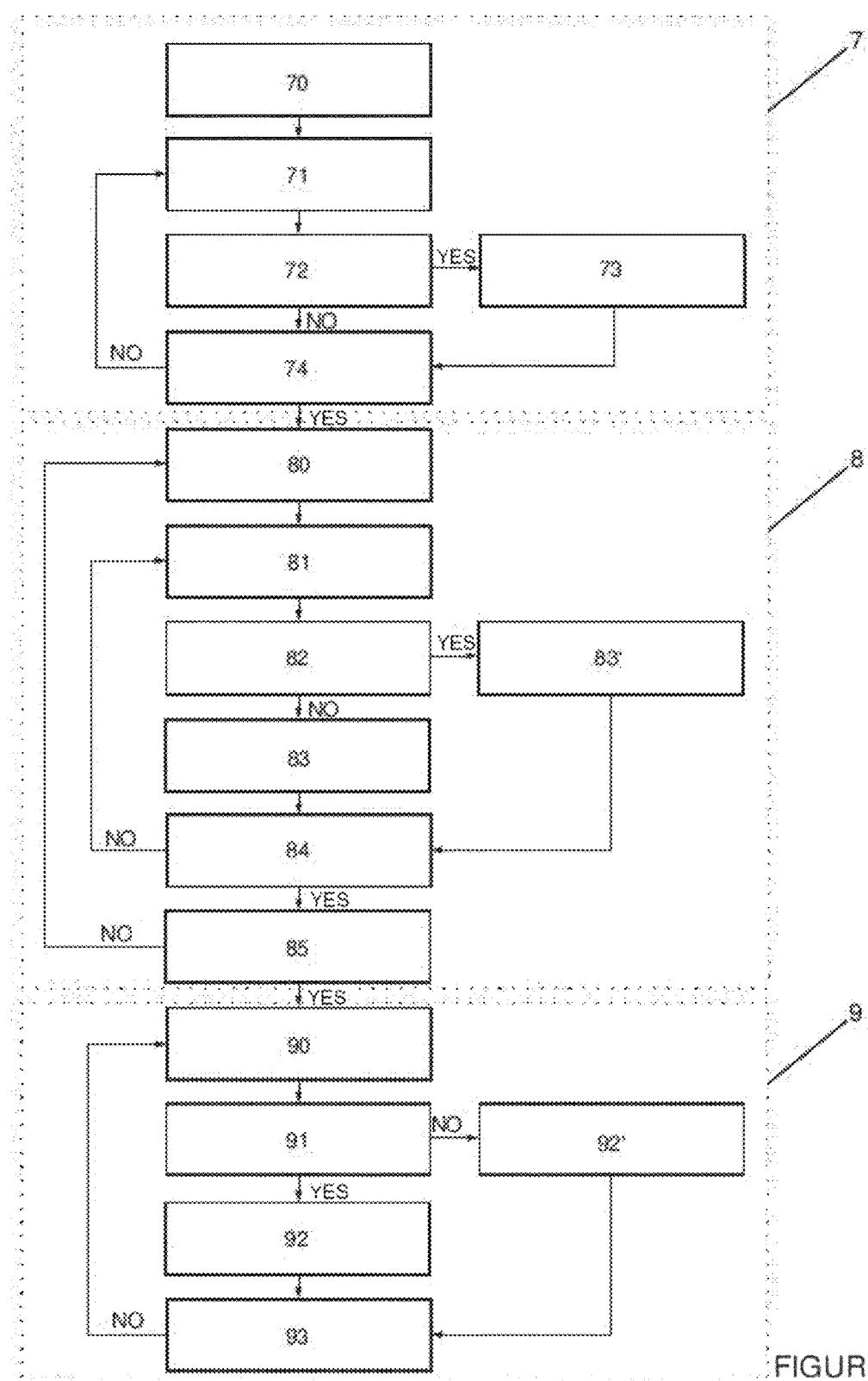

The present invention relates to methods for adjustment of points and/or patterns printed on any substrate, and more particularly the association of such methods with alignment methods of mechanical systems.

TECHNOLOGICAL BACKGROUND OF THE INVENTION

The alignment of systems comprising a mechanical part is a problem appearing at the same time as the systems themselves. As is known per se, digital adjustment methods especially equate existing experimental points and find application in fields where the precise alignment of systems comprising a machine or a device is essential.

By way of example, there is the field of printing and in particular machines comprising a plurality of printing heads. In fact, the diversity of applications engendered by the possibilities of these machines needs the majority of time the presence of several printing heads within the same machine. But for the operation of the printing machine to be optimal, these heads must be aligned with precision close to the resolution of printing, involving micrometric adjustments. Therefore, adjustment via digital methods makes perfect sense.

Many methods reducing artefacts linked to poor alignment of mechanical systems depending on each other are described in the prior art.

A particular example is document WO 2005/039881, disclosing a method for alignment of printing heads comprising each a plurality of nozzles. To form a pattern which will serve as alignment of the heads, each printing head prints on a substrate a series of drops. After acquisition and digitisation of this pattern, computer means calculate the distance between each series of points and compare them to an ideal distance, characteristic of optimal alignment between the heads. The result of this comparison acts as a basis for alignment of the printing heads relative to a reference head. However, this digital adjustment method is done on isolated printing marks.

Another example is document US 2011/0169893, which discloses an ink jet printing machine comprising adjustment means of the alignment of the substrate. At least one printing head makes a pattern composed of specific points, said pattern being later digitised by acquisition means contained in the printing machine. This digital image is then analysed, the position of the points being compared to the position of points within the scope of optimal alignment. The result of this comparison acts as a basis for alignment of the substrate by means of adjustment means. However, and as previously, the digital adjustment method is carried out on isolated printing marks. On the other hand, it is not the printing heads, but the printing substrate which needs to be aligned.

GENERAL DESCRIPTION OF THE INVENTION

The aim of the present invention is to propose a method for evaluation and correction of the alignment of printing heads carried out thanks to at least one adjustment algorithm, allowing greater precision in its use by doing away with inaccuracies linked to ejection of drops from the printing heads, while limiting use of resources of the computer system on which the method is used. On the other hand, the number of printing heads whereof the alignment must be evaluated and optionally corrected has very little influence on the overall processing time imposed by said method.

For this purpose, the invention relates to a verification method of the alignment of at least one printing head installed on a printing machine, by linear adjustment of at least one group of points shown on an image originating from the digitisation of a model comprising a plurality of printed drops, characterized in that each drop comprises a plurality of points, each point having a uniform tint according to a colorimetric database saved in a memory area of a computer system executing the method and comprising at least one memory space, means for acquisition, recording and processing of data, the method comprising:

a. a detection step of the colour of the points by the processing means, followed by attribution by the processing means of spatial coordinates and colorimetric coordinates at each point of a digital image of a model recorded in memory, these coordinates being respectively associated with a coordinate spatial relative to the image and a colorimetric table recorded in a memory space of the computer system, b. a creation step, by the processing means, of at least one list of points of the same colorimetric coordinates, the data relative to at least this list being recorded in memory by the data-recording means, c. a creation step, by the processing means, of at least one group of points of the same list of points of the same colorimetric coordinates and whereof each point belonging to said group must be located at a distance less than a distance d/2 from a point of another group, the distance d recorded in memory corresponding to the minimal distance between two groups of points, d. a filtering and removal step of groups whereof the number of points is less than a limit value recorded in a memory area of the computer system, e. a vectorization step, by the processing means, of at least one group of points, followed by the recording in memory by the recording means of the coordinates of at least one corresponding vector, f. an association step, via the processing means, of each vector with the corresponding printing head, a database connecting each printing head to a colorimetric coordinate being recorded in memory, g. a comparison step by means of processing means of coordinates of vectors with the coordinates of respective optimal vectors recorded in memory and characterizing optimal alignment of the heads.

Therefore, the colorimetric and spatial coordinates discriminate the points.

According to another particular feature, the method is characterized in that a point is the smallest element of uniform tint, or pixel, of the image of the model recorded.

According to another particular feature, the method is characterized in that only those points, whereof the colorimetric coordinates are associated via the processing means with a reduced portion of the colorimetric table, are integrated into at least one of the lists created in step b, said reduced portion being recorded in a memory space of the computer system.

According to another particular feature, the method is characterized in that an additional removal step of points of a drop whereof the number of points is less than a value which can be selected by the user and recorded in memory, is realised via the processing means just prior to step e of the method.

According to another particular feature, the method is characterized in that the value of the distance d is selected and recorded in memory by a user via input means linked to the computer system.

According to another particular feature, the method is characterized in that the groups of points are vectorized by the processing means as per the method of least squares.

According to another particular feature, the method is characterized in that each group of points is adjusted by a linear function, such that the sum of the squares of the deviations of the coordinates, in the direction parallel to the direction of printing (y), of each point of the group relative to the linear adjustment function is minimal.

An additional aim of the invention is to propose a method for alignment of printing heads.

For this purpose, the invention relates to a method for alignment of at least one printing head installed on a printing machine, the position of each head able to be adjusted by means of regulation means in a plane parallel to the substrate, each head comprising a plurality of nozzles, the printing machine comprising in particular displacement means of the substrate, measuring means of the instantaneous speed of the substrate when moving, computer means for managing printing and alignment operations, the computer means comprising at least one memory area, means for acquisition, recording and processing of data, the method being characterized in that it comprises:

a. a creation step by the computer processing means and recording by the recording means in a memory area of the computer system, of a digital model usable for alignment of the printing heads, b. a printing step of said model with the printing machine on the basis of the model created by the processing means and recorded in memory, the model comprising at least one pattern, each pattern being composed of a plurality of printing drops, c. a digitisation step of the model printed by the acquisition means controlled by the processing means of the computer system, followed by the recording in memory by the recording means of the image of the acquired model, d. a vectorization step of the patterns of the image according to claim 1, the created vectors combining points having in particular the same colorimetric coordinates, e. a generation step by the processing means and recording by the recording means in a memory area of the computer system, of a configuration file of the alignment of at least one printing head performed on the basis of results obtained in the prior step.

According to another particular feature, the method is characterized in that the printing machine comprises, independently of the displacement means, a detection means of the edges of the substrate perpendicular to displacement, so that the processing means triggers printing of at least one printing head at the opportune moment to perform printing of a model, the instantaneous displacement speed of the substrate being known at each instant and the optimal distance between the detection means and each printing head being recorded in a memory area of the computer system.

According to another particular feature, the method is characterized in that a display step of configuration data of the alignment of at least one printing head is performed parallel to generation of the configuration file, via display means contained in the computer means.

According to another particular feature, the method is characterized in that the regulation means of heads modify the position of the heads according to two linear directions respectively perpendicular and parallel to the direction of printing, and according to an angular direction in a plane parallel to the substrate.

According to another particular feature, the method is characterized in that the printed model comprises on the one hand at least one pattern substantially perpendicular to the direction of printing, each pattern being made by all or some of the nozzles of each printing head, and on the other hand at least one pattern substantially parallel to the direction of printing, each pattern being performed by the same nozzle of a printing head, the patterns perpendicular to the direction of printing verifying the angular alignment of the heads and alignment of the heads according to the direction parallel to the direction of printing, the patterns parallel to the direction of printing verifying alignment of the heads according to the direction perpendicular to the direction of printing.

According to another particular feature, the method is characterized in that the data acquisition means comprise a 2D image sensor whereof the resolution is between 0.1 and 100 megapixels, preferably around 6 megapixels.

According to another particular feature, the method is characterized in that the data acquisition means comprise a linear image sensor fixed on the machine and connected to the measuring means of the instantaneous speed of the substrate, and whereof the field of vision is at least as wide as the model printed on the substrate, said sensor being controlled by the computer means so as to digitise all the patterns printed on the substrate, the position of the substrate being known at each instant by the measuring means of the instantaneous speed of said substrate.

According to another particular feature, the method is characterized in that a calibration step by the acquisition and processing means precedes the digitisation step of the model.

Figure 2:
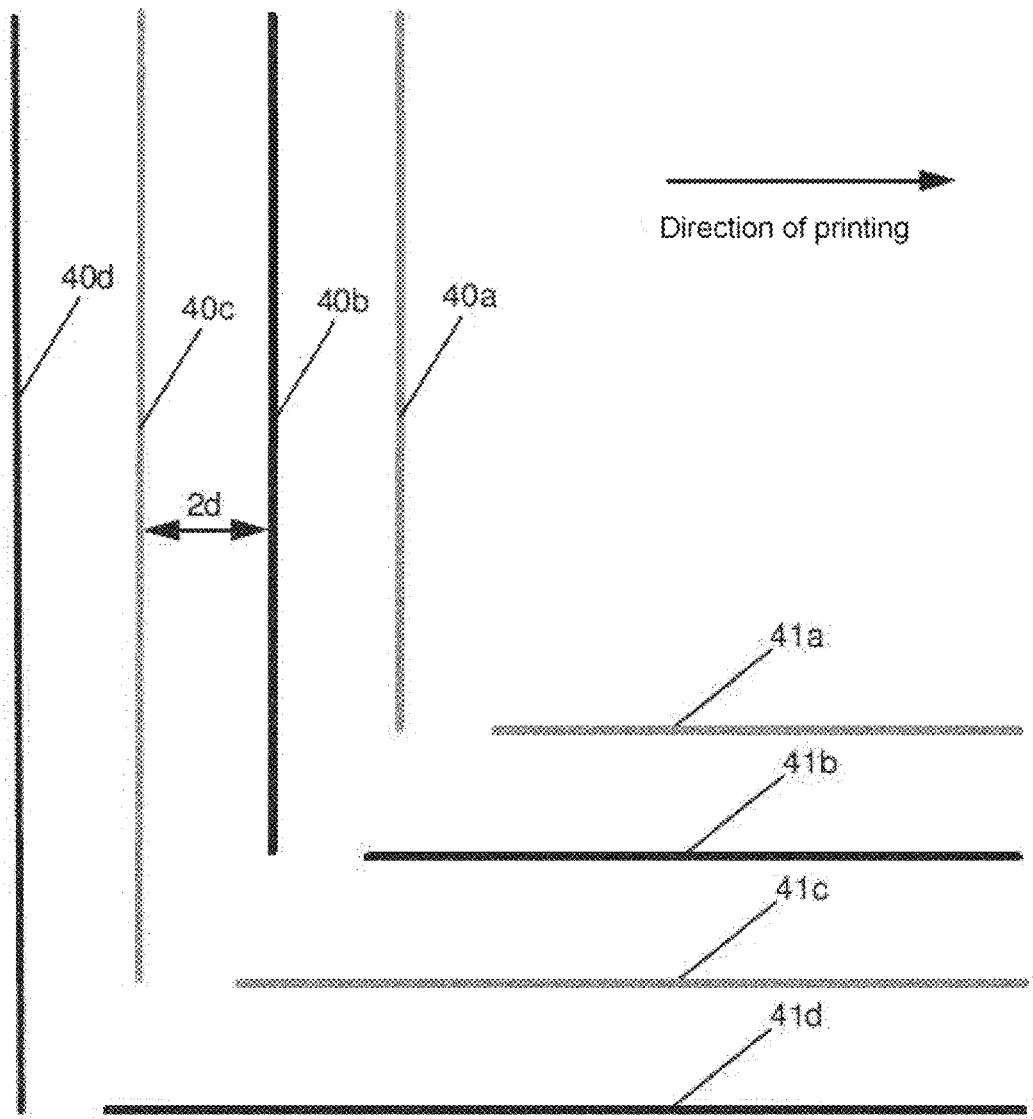
Figure 3:
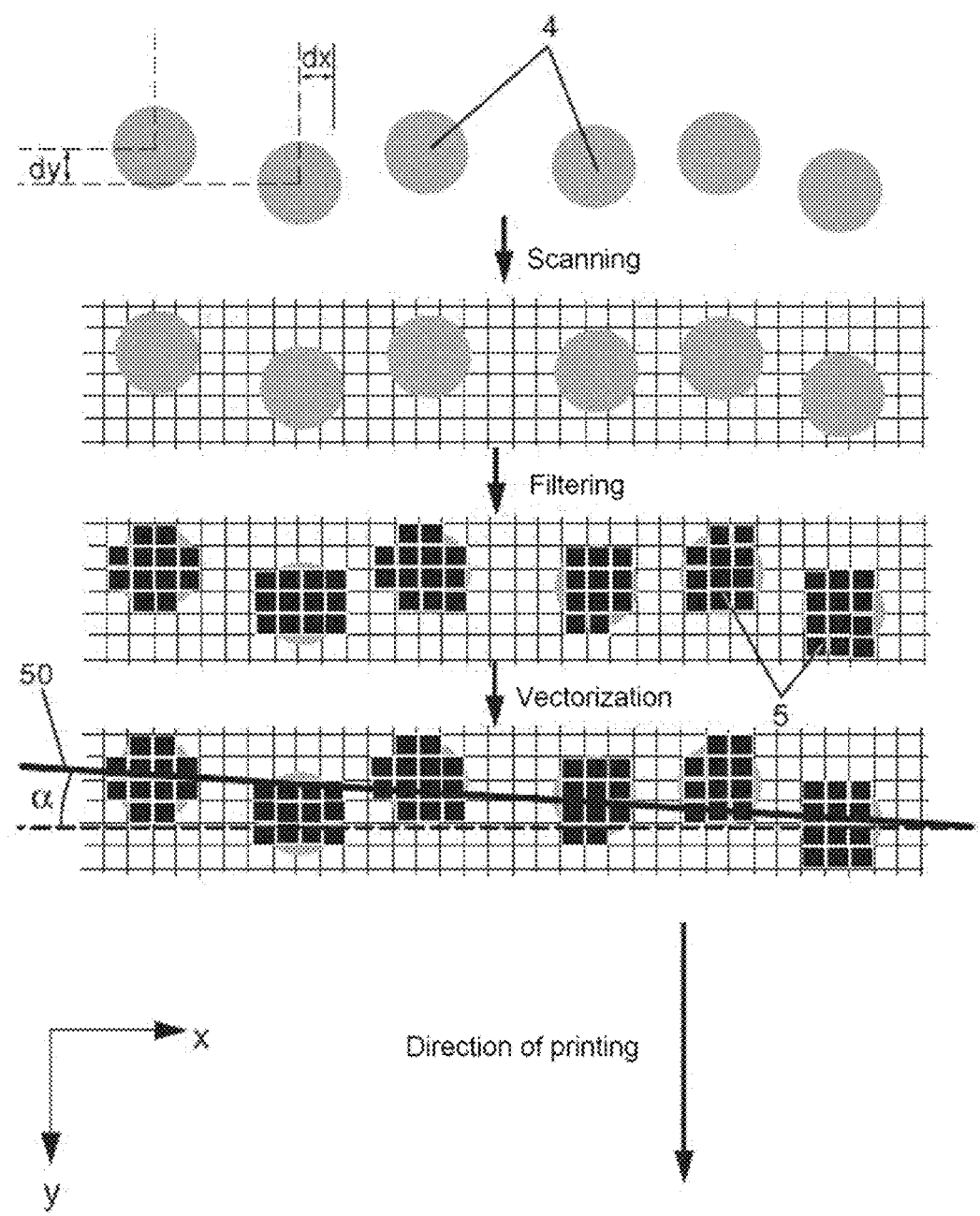
Figure 4:
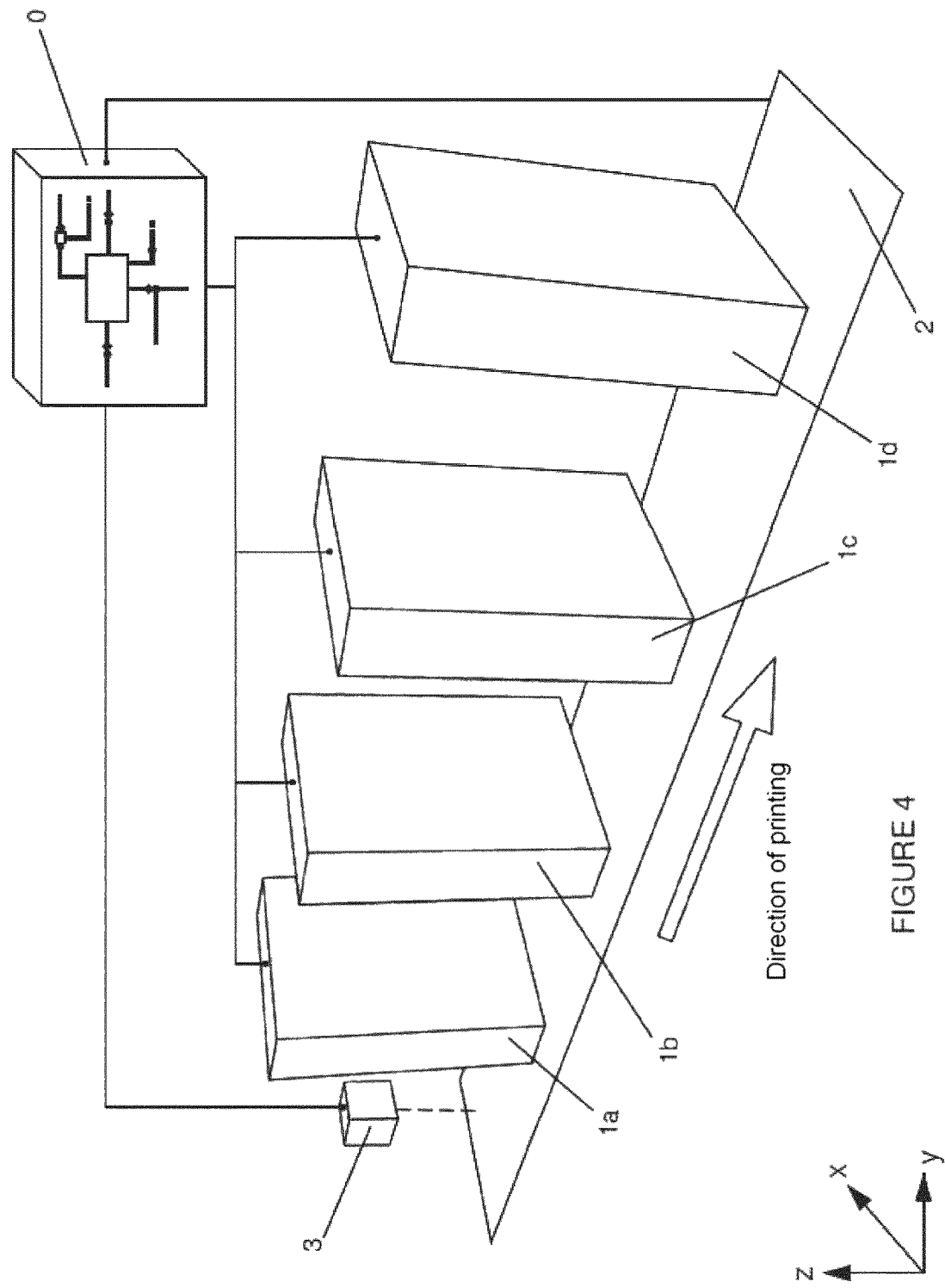
Figure 5:
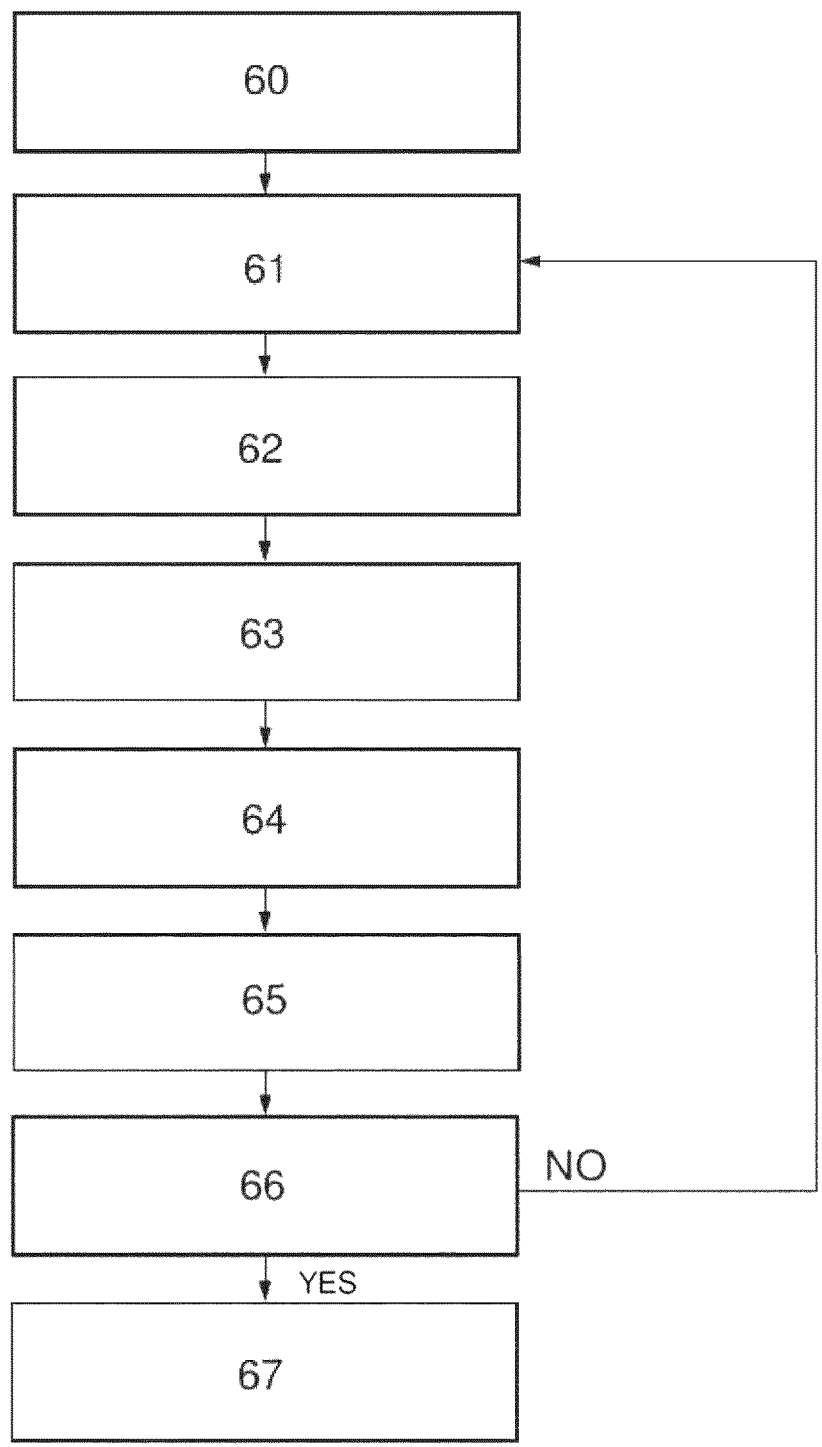
Figure 6A:
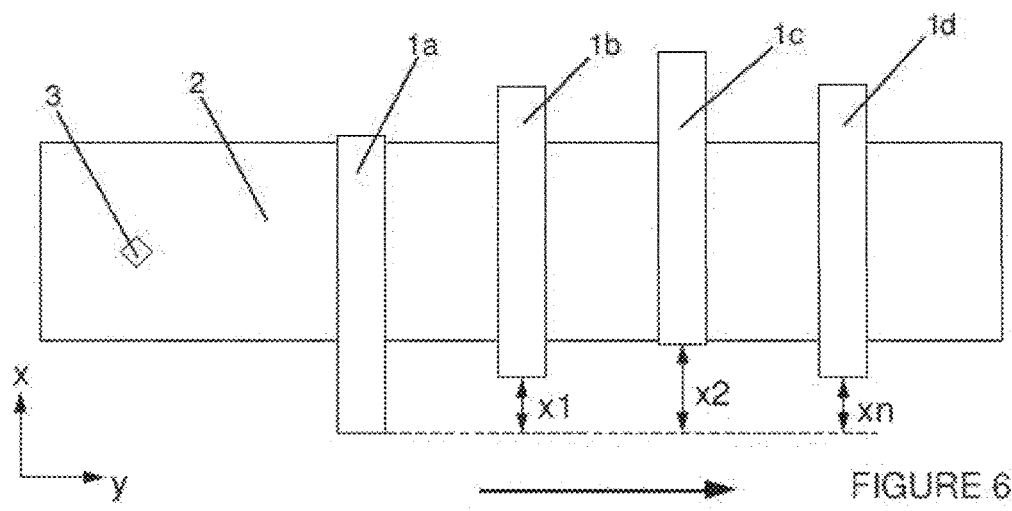
Figure 6B:
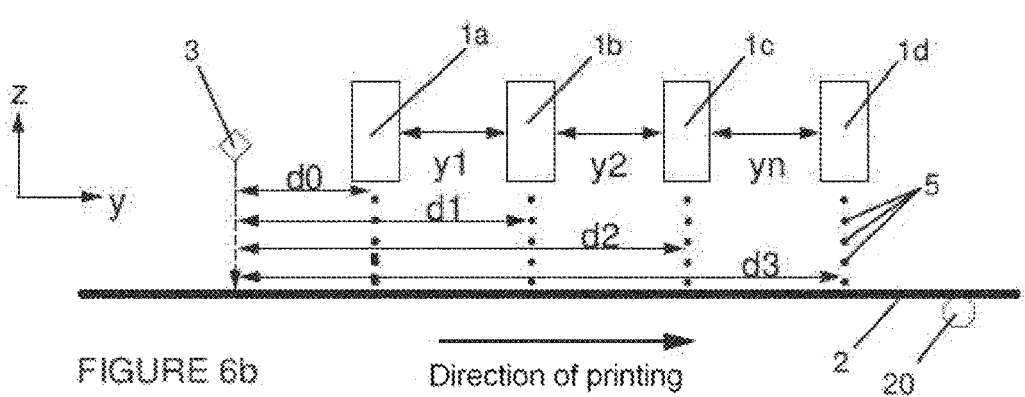
Figure 6C:
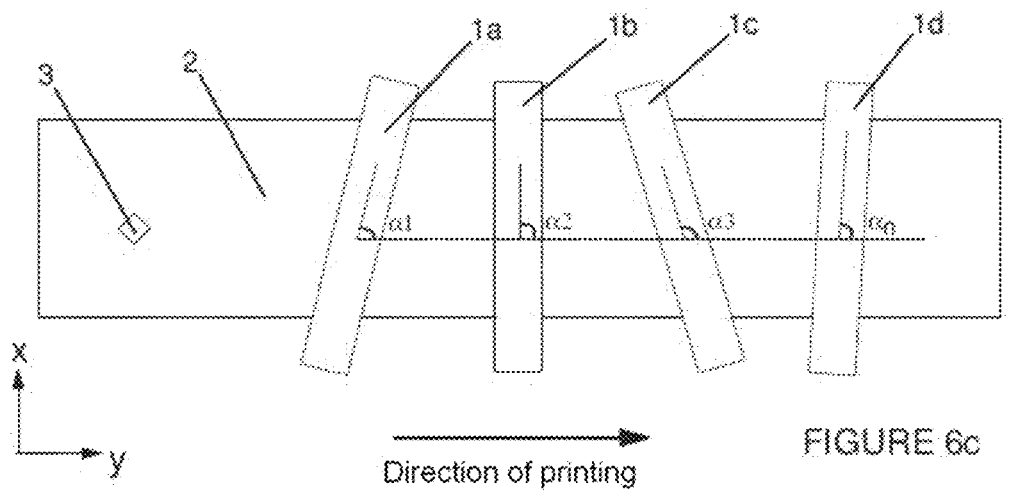

The invention, with its characteristics and advantages, will emerge more clearly from the description given in reference to the appended drawings, in which:

FIG. 1 illustrates a functional diagram of the algorithm performing the linear adjustment, FIG. 2 illustrates an example of a model comprising several patterns, FIG. 3 illustrates a representation of portions of the pixelated and vectorized pattern, FIG. 4 illustrates a simplified three-dimensional sketch of the printing machine, FIG. 5 illustrates the functional diagram of the alignment method of the printing heads, FIGS. 6a to 6c illustrate the possible position defaults of the printing heads.

FIG. 7 illustrates a diagram for positioning the printing heads in quincunx.

DESCRIPTION OF PREFERRED EMBODIMENTS OF THE INVENTION

In reference to FIG. 1, the verification method of the alignment of at least one printing head installed on a printing machine, by linear adjustment of at least one group of point (5) will now be described. The method is executed by means of a computer system (0), comprising for example and in a non-limiting manner data processing means, for example and in a non-limiting manner a central processing unit (CPU), data acquisition means controlled by the data processing means, data-recording means linked to at least one memory space, for example and in a non-limiting manner a mass storage device, a flash memory of USB type linked to a read/write interface, an optical reader/recorder. In some embodiments, the printing heads (1a, 10a, 1b, 10b, 1c, 1d)

comprise at least one row comprising a plurality of nozzles aligned in a direction perpendicular to the direction of printing, said heads (1a, 10a, 1b, 10b, 1c, 1d) being arranged one after another in the printing machine. In some embodiments, illustrated in FIG. 7, the printing heads are arranged in quincunx. For example and in a non-limiting manner, the printing heads (1a, 10a, 1b, 10b, 1c, 1d) are ink jet heads, and the nozzles comprise elements generating pressure waves, controlled by the computer system and expelling drops of liquid (5) onto the substrate (2), for example and in a non-limiting manner ink or varnish. For example and in a non-limiting manner, these elements are piezoelectric elements. In some embodiments, the aim of the invention is to achieve, by means of at least one algorithm contained in software installed on the computer system, refined equating of at least one pattern (40, 41) shown on an image of a model recorded and saved in at least one memory space of the computer system (0). This equating is achieved according to a method whereof the steps successive will now be described.

This method comprises three principal phases (7, 8, 9), in turn comprising several steps.

In preferred embodiments, the image originating from digitisation of a printed model comprising a plurality of printed drops (4), each drop (4) comprising a plurality of points (5). In a preferred embodiment, a point (5) is the smallest element of uniform tint present on the image of the model recorded, and according to a colorimetric database the tint of which is saved in a memory area of the computer system (0). Therefore, throughout the description, the term "pixel" will be used to describe the points (5) forming the patterns of the model.

The first phase of the method is a filtering phase (7) of the colours of the pixels (5). In a first step, the processing means of the computer system create lists of colours (70), each list being recorded by way of recording means in a memory area of the computer system (0). Each list is representative of the colour of a printing head (1a, 10a, 1b, 10b, 1c, 1d). There is therefore at least as many lists created as printing heads (1a, 10a, 1b, 10b, 1c, 1d) installed on the printing machine. In a second step, the processing means analyse each pixel (5) separately, to first attribute them colorimetric coordinates (71) and eliminate the pixels (5) the colour of which does not correspond to any known or preferred colour (72), a list of colorimetric coordinates of interest being recorded in a database contained in a memory space of the computer system (0). For example and in a non-limiting manner the colorimetric coordinates used comply with the RGB code.

In a second instance, when the colour of a pixel (5) is in the list of colorimetric coordinates recorded in the database, the processing means of the computer system (0) will associate the corresponding pixel (5) in one of the created lists, and attribute it spatial coordinates (73), for example and in a non-limiting manner in an orthonormal coordinate whereof axes x and y are perpendicular and in the plane of the image of the model, the third axis z being perpendicular to the two others.

The lists of pixels (5) therefore created by the processing means and recorded in a memory area of the computer system (0), comprise the spatial coordinates of a set of pixels (5) having the same colorimetric coordinates. Therefore there are as many lists as colorimetric coordinates. Once finalised, all these lists are recorded in a memory area of the computer system (0) by data-recording means.

Once all the pixels (5) of the model are analysed by the processing means (74), said processing means initiate the second phase (8) of the method, consisting of analysis of each list of pixels (5) so as to create groups of pixels (5). Each list is discriminated in at least one group.

In a first step, the processing means select a first list (80) of pixels (5). Each pixel (5) of the list is analysed (81) by the processing means: the processing means consider that two separate groups of pixels (5) must be separated by a minimal distance d, recorded in a memory area of the computer system (0). In some embodiments, the threshold distance (d) is entered via an input interface by a user in a memory area of the computer system (0).

If a pixel (5) is located at a distance less than d/2 from a group, said pixel (5) belongs to said group (82), and these spatial coordinates are associated with said group (83'). If the pixel (5) of a list is not close to any recognised group, a new group of pixels is created (83). By way of example and in a non-limiting manner, two groups of pixels (5) represent two separate patterns (40, 41) on the image of the model. Remember that the groups of pixels (5) belonging to the same list of pixels (5) all have the same colorimetric coordinates. In conclusion, a group of pixels (5) is a set of pixels (5) belonging to the same pattern (40, 41) from a plurality shown on a model, and whereof the colorimetric coordinates are identical. In a preferred embodiment, the patterns (40, 41) are substantially linear. The processing means analyse all the pixels (5) of a list (84), and also for all the lists recorded (85) in a memory area of the computer system (0), prior to moving on to the third step (9) of the method, consisting of analysis by the processing means of each group of pixels (5), such that an linear adjustment algorithm is applied to them. The processing means select a group (90) of pixels (5), and evaluate the number of pixels (5) present in each group (91). If the number of pixels (5) is less than a value recorded in a memory area of the computer system (0), this value which can be selected by a user and entered via input means connected to the au computer system, then the processing means cancel (92') said group of pixels (5).

Therefore, each group whereof the number of pixels (5) is greater than a value recorded in the computer system (0), is vectorized (92), that is, all the pixels (5) of the same group are adjusted, by way of an adjustment algorithm, by the vector (50) closest to the pattern (40, 41) shown on the model. The method is terminated when all the groups containing enough pixels (5) are vectorized (93).

In a preferred embodiment, the algorithm executing the adjustment is based on the method of least squares. Each group of pixels (5) is therefore adjusted by a linear function whereof the equation is of type $Y=aX+b$. Digital analysis based on the method of least squares, even though known to those skilled in the art, consists of finding coefficients a and b of the linear function for minimising the quantity corresponding to the sum of the squares of the distances of coordinates of the pixels (5) on the substrate (2) in a direction substantially parallel to the direction of printing (y) relative to the right side of the equation $Y=aX+b$.

The coordinates of the vectors (50) adjusting each group of pixels (5) are finally recorded in a memory area of the computer system, by means of data-recording means.

The processing means link each calculated vector to the corresponding printing head (1a, 10a, 1b, 10b, 1c, 1d), a database connecting each printing head (1a, 10a, 1b, 10b, 1c, 1d) to a colorimetric coordinate being recorded in a memory area of the computer system (0). Finally, the processing means compare the coordinates of the calculated vectors to the coordinates of optimal vectors recorded in a memory area of the computer system (0), characterising optimal alignment of printing heads (1a, 10a, 1b, 10b, 1c, 1d). Alignment of the printing heads based on this type of vector, a result of adjustment of a group of pixels (5) contained in printing drops (4), eliminates inaccuracies linked to ejection of drops from the printing heads to the substrate (2). For example and in a non-limiting manner, each piezoelectric element controlling ejection of the drops (4) has an inaccuracy in a direction perpendicular to the direction of printing (dx) and an inaccuracy in a direction parallel to the direction of printing (dy). The vectorization of groups of pixels (5) does away with these inaccuracies.

In some embodiments, an optional step can be inserted into the method. It consists of the processing means cancelling any artefacts present on the model, which must not be combined with the patterns (40, 41) to be adjusted and vectorized. For example and in a non-limiting manner, these artefacts can be dust or numerical errors on the image. For example and in a non-limiting manner, a method for treating and filtering the image eliminates all the details of the image whereof the size is not between two threshold values recorded in a memory area of the computer system.

In some embodiments and in reference to FIG. 7, the printing heads (10a, 10b) can be installed in quincunx in the printing machine. According to this particular embodiment, some nozzles belonging to different printing heads can have the same coordinates according to the direction perpendicular to the direction of printing (axis x). In this case, there is the risk of overlapping during printing. To avoid this disadvantage, the computer means deactivate some nozzles (110a, 110b) of the printing heads (10a, 10b), such that there is no overlap area during printing, and retains the printing precision relative to the distance between two nozzles of the same printing head (10a, 10b). Therefore, for each coordinate along the axis x for which the computer means (0) rank at least one printing nozzle, a single nozzle (100a, 100b) will be activated while all the other nozzles (110a, 110b) having the same coordinates along the axis x will be deactivated.

Another aim of the invention is to propose, in some embodiments, a method for alignment of at least one printing head (1a, 10a, 1b, 10b, 1c, 1d) installed on a printing machine comprising at least one printing head (1a, 10a, 1b, 10b, 1c, 1d). In reference to FIG. 4, the printing machine comprises a computer system (0) managing in particular the printing and alignment operations of the heads (1a, 10a, 1b, 10b, 1c, 1d), and comprising in particular data processing means, for example and in a non-limiting manner a central processing unit (CPU), data-recording means linked to at least one memory space, for example and in a non-limiting manner a mass storage device, a flash memory of USB type linked to a read/write interface, an optical reader/recorder, and displacement means of the printing substrate, the speed of said displacement means measured instantaneously by an encoder (20). In some embodiments, the encoder (20) is a rotary optical encoder comprising a light source, a striated disc, whereof the striae are substantially equidistant, and a photodetector. Therefore, when the disc is in rotation inside the encoder, the photodetector is able to receive light from the source when a stria is located on the path located between the photodetector and the light source. The number of striae being well known, and knowing that the movement of the striated disc is directly dependent on the movement of the displacement means of the printing machine, the encoder (20) therefore knows at any moment the instantaneous speed of the displacement means and especially of the substrate (2). The resolution of the encoder (20) depends on the number of striae present on the disc. For example and in a non-limiting manner, the rotary optical encoder has a resolution of 6500 characters-per-inch (cpi), or precision of the order of 4 micrometers.

Each printing head (1a, 10a, 1b, 10b, 1c, 1d) comprises regulation means of the position, which adjust the position according to two linear directions—one perpendicular to the direction of printing (x), and one parallel to the direction of printing (y)—and in an angular direction, in a plane parallel to the substrate. These regulation means are for example and in a non-limiting manner screws with micrometric pitch mounted on springs and each able to be connected to a motor controlled by the computer system. In some non-limiting embodiments, piezoelectric motors controlled by the computer means act as regulation means.

Finally, in preferred embodiments the printing machine comprises a detection cell (3) of the presence of a substrate, controlled by the computer system, whereof the function is to detect the edges of the substrate perpendicular to the direction of printing. When the detection cell (3) detects an edge of the substrate perpendicular to the direction of printing, detection information is sent to the computer system. Since the distance between the cell and each printing head is known and recorded in a memory area of the computer system, and the instantaneous speed of the substrate is also known at each instant because of the rotary optical encoder (20), the processing means of the computer system are then able to activate those elements generating pressure waves of the nozzles of each printing head at the precise instant when drops of liquid (4) must be expelled to form a printing pattern (40, 41). Therefore, the person skilled in the art understands the necessity of positioning the heads (1a, 10a, 1b, 10b, 1c, 1d) as best as possible to ultimately avoid artefacts during printing.

In reference to FIG. 5, in some embodiments the method for aligning at least one printing head (1a, 10a, 1b, 10b, 1c, 1d) installed on a printing machine will now be described.

During the first step of the method (61), a digital alignment model comprising several patterns (40, 41) is made by the processing means, each pattern (40, 41) comprising a set of pixels (5) whereof the colorimetric coordinates are identical. The model is adapted as a function of the number of heads (1a, 10a, 1b, 10b, 1c, 1d) whereof the position must be verified and/or corrected by the processing means, and as a function of the type of correction to be made to each printing head (1a, 10a, 1b, 10b, 1c, 1d). For example and in a non-limiting manner, the model is composed of substantially linear patterns (40, 41).

During the second step (62), printing of the model created by the processing means in the prior step, and recorded in a memory area of the computer system, is carried out on a substrate (2) by means of the printing machine controlled by the computer system. In some embodiments and in reference to FIG. 2, the model comprises at least one pattern (41a, 41b, 41c, 41d) substantially linear and parallel to the direction of printing, and at least one pattern (40a, 40b, 40c, 40d) substantially linear and perpendicular to the direction of printing. Each pattern (41a, 41b, 41c, 41d) parallel to the direction of printing—in direction y—is made by the same nozzle of a printing head, while each pattern (40a, 40b, 40c, 40d) perpendicular to the direction of printing—in direction x—is made by all or some of the nozzles of the same printing head (1a, 10a, 1b, 10b, 1c, 1d), said nozzles expelling drops of liquid (4). Each pattern (40, 41) is composed of a plurality of drops (4). The patterns (40a, 40b, 40c, 40d) perpendicular to the direction of printing verify the angular alignment of the heads (1a, 10a, 1b, 10b, 1c, 1d) and the alignment of the heads according to the direction parallel to the direction of printing, the patterns (41a, 41b, 41c, 41d) parallel to the direction of printing verifying alignment of the heads (1a, 10a, 1b, 10b, 1c, 1d) according to the direction perpendicular to the direction of printing.

During the third step, the model printed in the prior step is digitised (63) by the acquisition means, said acquisition means being controlled by the processing means of the computer system. In some embodiments, the acquisition means comprise a 2D image sensor installed outside the printing machine, and positioned above the printed substrate, and linked to the computer system. For example and in a non-limiting manner, the resolution of the sensor can be between 0.1 and 100 megapixels, preferably around 6 megapixels. As is preferred and in a non-limiting manner, a digital camera is used to digitise the model. Once digitised, the model is recorded by the recording means in a memory area of the computer system.

In some embodiments, the acquisition means comprise a linear sensor, fixed on the printing machine and directly linked on the one hand to the computer means (0) and also to the measuring means of the instantaneous speed (20) of the substrate (2). While a 2D camera, such as that described in the previous paragraph, digitises the patterns (40, 41) of the substrate (2) in one session and quasi-instantaneously, a linear sensor is linked to the measuring means of the instantaneous speed (20) of the substrate (2) to digitise the patterns (40, 41) of the substrate (2) as the latter advances in the field of vision of the linear sensor. For example and in a non-limiting manner, as the instantaneous speed of the substrate (2) is known at each instant with a high degree of precision, the computer means (0) activate the linear sensor at the precise instant when the first edge of the substrate (2), according to the direction of printing and perpendicular to the direction of printing, enters the field of vision of the linear sensor. In the same way, when the edge opposite the substrate (2) exits from the field of vision of the linear sensor, the computer means (0) deactivate the linear sensor. According to another non-limiting example, the computer means (0) activate the linear sensor when the latter scans a reduced area of the surface of the substrate (2), the coordinates of this area being previously recorded in a memory area of the computer system. Between these two actions, the patterns (40, 41) present on the substrate (2) are digitised. In some embodiments, the field of vision of the linear sensor is at least as wide as the printed pattern on the substrate (2).

Digitising the substrate (2) with a linear sensor is an operation which is performed online, during the method for printing patterns (40, 41) on the substrate (2). Use of a 2D camera allows digitisation of the different models made later on: in this case digitisation can therefore be done offline, the positioning of the substrate (2) in this case being done by the user.

As an option, a calibration step (60) by the acquisition and processing means precedes the third step of the method. For this purpose, a calibration model is made by the printing machine, controlled by the computer system. This calibration model comprises two patterns (41a, 41b, 41c, 41d) substantially parallel to the direction of printing, each pattern being composed of a plurality of drops (4) made by the same nozzle, the two patterns (41a, 41b, 41c, 41d) being made by two nozzles at a distance and separated by a distance the value of which is known, this value being stored in the computer system, the two nozzles belonging to the same printing head (1a, 10a, 1b, 10b, 1c, 1d). The acquisition means digitise the calibration model which is recorded in a memory area of the system. The adjustment method described earlier in the description is applied to the two patterns (41a, 41b, 41c, 41d) of the model, therefore creating two vectors (50) parallel to the direction of printing. The distance measured between these two vectors is linked by the processing means to the real distance separating the two nozzles.

During the fourth step (64) and in reference to FIG. 3, the processing means of the system apply the method of linear adjustment described earlier. Each drop (4) of the model is pixelated by the processing means, colorimetric and spatial coordinates being attributed to each pixel (5) of the model. In some non-limiting embodiments, the pixels (5) whereof the colorimetric coordinates correspond to no colour able to be proposed by all the printing heads (1a, 10a, 1b, 10b, 1c, 1d) of the printing machine, are eliminated and erased from the memory of the system. Lists of pixels (5) of the same colorimetric coordinates are then created by the processing means and recorded by the recording means in a memory area of the computer system. Groups of pixels (5) are then created, each group comprising pixels (5) of the same colorimetric coordinates, each pixel (5) located at a distance less than d/2 from a group belonging to said group, the value of the distance d recorded in memory being greater than the size of a drop (4) and less than the minimal distance between two groups of pixels (5). A step deleting the groups whereof the number of pixels (5) is less than a threshold value recorded in a memory area of the computer system (0), is performed by the processing means. This value threshold can be entered by a user via input means, for example and in a non-limiting manner a man/machine interface of keyboard type. As an option, a step for deleting artefacts, for example and in a non-limiting manner dust or satellite drops, is conducted by the processing means. Finally, each group of pixels (5) identified by the processing means is adjusted according to a linear adjustment algorithm, for example and in a non-limiting manner an algorithm applying the method of least squares. Each group is therefore vectorized, the coordinates of said vectors (50) being recorded in a memory area of the computer system.

Each vector (50) is then associated, via the processing means, with a printing head (1a, 10a, 1b, 10b, 1c, 1d), by comparison of the colorimetric coordinates of each vector (50) with the colorimetric coordinates corresponding to the colour of each printing head (1a, 10a, 1b, 10b, 1c, 1d) and recorded in memory in a database of the computer system (0). In preferred embodiments and in a non-limiting manner, each printing head (1a, 10a, 1b, 10b, 1c, 1d) is associated with a vector (50) substantially parallel to the direction of printing—in direction y—and a vector (50) substantially perpendicular—according to direction x—to the direction of printing.

Finally, coordinates of the vectors (50) obtained following application of the linear adjustment algorithm are compared to ideal coordinates of these same vectors obtained in conditions for positioning the heads (1a, 10a, 1b, 10b, 1c, 1d), these ideal coordinates being recorded in memory in a database of the computer system, corresponding to an optimal position of each printing head (1a, 10a, 1b, 10b, 1c, 1d) of the printing machine. Therefore, the optimal distances between each printing head (1a, 10a, 1b, 10b, 1c, 1d) are known and stored in a database of the computer system. Similarly, the spread distances between the nozzles of the same printing head (1a, 10a, 1b, 10b, 1c, 1d), and for each printing head (1a, 10a, 1b, 10b, 1c, 1d), are known and stored in this same database. Finally, printing heads (1a, 10a, 1b, 10b, 1c, 1d) positioned optimally make patterns (40, 41) which are adjusted by parallel vectors (50).

As described earlier, the position of the printing heads (1a, 10a, 1b, 10b, 1c, 1d) can be adjusted by way of the regulation means in two linear directions—one parallel to the direction of printing (y) and the other perpendicular (x) to the direction of printing—and an angular direction in a plane parallel to the substrate. In reference to FIGS. 6a to 6c, the positioning defaults (65) calculated as per these three directions will now be described hereinbelow.

Default for angular positioning, in a plane parallel to the substrate. To measure the possible angular deviation of the printing heads (1a, 10a, 1b, 10b, 1c, 1d), the coordinates of vectors (50) substantially perpendicular to the direction of printing are analysed by the processing means. As a reminder, the coordinates of vectors (50) are obtained by linear adjustment of pixels (5) belonging to the same group as per an algorithm, recorded in a memory area of the computer system (0) and controlled by said system, the equation of the right side adjusting said pixels being of the type Y=aX+b. If a printing head (1a, 10a, 1b, 10b, 1c, 1d) is correctly aligned, the equation adjusting the points of the same vector (50) is of type Y=b, the value a being zero in this case. If the equation adjusting the points of the same vector (50) is of type Y=aX+b (a being different to 0), correction of the angular alignment of the corresponding head (1a, 10a, 1b, 10b, 1c, 1d) relative to the direction of printing is to be made.

Default for positioning according to direction y, parallel to the direction of printing. As described earlier, comparison of data of the encoder (20) with those sent by the cell (3) detecting the substrate allows the nozzles to expel drops of liquid (4) such that any pattern (40, 41) is printed faithfully, even within the scope of the use of several printing heads (1a, 10a, 1b, 10b, 1c, 1d) simultaneously. In fact, the instantaneous speed v of the substrate (2) as well as its precise position at an instant $t_0$ recorded in memory are known at each instant. The theoretical distance $d_i$ of each printing head (1a, 10a, 1b, 10b, 1c, 1d) from the detection cell (3) of the substrate (2) is also known and stored in a database of the computer system. Therefore, on the basis of this information on distance and speed, the processing means deduce precisely the initiation time of the printing head (1a, 10a, 1b, 10b, 1c, 1d) as number i, and send information activating the piezoelectric elements of at least one nozzle of the printing head (1a, 10a, 1b, 10b, 1c, 1d). During printing of the alignment model, the theoretical distance between two vectors (50) substantially perpendicular to the direction of printing, one representative of the printing reference head (1a) and the other representative of another printing head (10a, 1b, 10b, 1c, 1d), is therefore theoretically known, and is the result of subtraction of the distances of each printing head (1a, 10a, 1b, 10b, 1c, 1d) having traced each vector (50) from the detection cell (3) of the substrate (2). The processing means conduct a real measurement of this distance and compare it to the theoretical value. If a difference is found by the processing means, correction of the position of a head (1b, 1c, 1d) in direction y relative to the reference head (1a) is to be made, the correction being equivalent to the difference between the theoretical value and the measured value of the distance of the vector (50) traced by the reference head (1a) to the vector (50) traced by the head (1b, 1c, 1d) having to be aligned in direction y, the reference head (1a) being for example and in a non-limiting manner the first printing head in the direction of printing.

Default for positioning in direction x, perpendicular to the direction of printing. During printing of the alignment model, the theoretical distance between two vectors (50) substantially parallel to the direction of printing is theoretically known, and corresponds to spacing between at least two nozzles. This value is stored in a memory area of the computer system. The processing means conduct a real measurement of this distance and compare it to the theoretical value. If a difference is found by the processing means, correction of the position of a head (1b, 1c, 1d) in direction x relative to the reference head (1a) is to be made, the correction being equivalent to the difference between the theoretical value and the measured value of the distance of the vector (50) traced by a nozzle of the reference head (1a) to the vector traced by a nozzle of the head (1b, 1c, 1d) to be aligned in direction x, the reference head (1a) being for example and in a non-limiting manner the first printing head in the direction of printing.

In a final step, once all the printing heads are analysed (66), a configuration file (67) of the alignment of the printing heads (1a, 10a, 1b, 10b, 1c, 1d) of the machine is compiled by the processing means, said file being stored in a memory area of the computer system. This file comprises corrections to be made to each printing head (1a, 10a, 1b, 10b, 1c, 1d) whereof the position must be verified and/or corrected. In some embodiments, this file comprises the values of corrections and the type of correction—in direction x, y and/or angular, or else which nozzles(s) to deactivate—to be made to the regulation means located on the printing heads (1a, 10a, 1b, 10b, 1c, 1d). In some embodiments, a display step of the configuration data of the alignment of at least one printing head (1a, 10a, 1b, 10b, 1c, 1d) is conducted in parallel with generation of the configuration file, via display means contained in the computer means.

This configuration file can be directly consulted by a user who will then carry out adjustments consisting of aligning the printing heads (1a, 10a, 1b, 10b, 1c, 1d). In some embodiments, this file can be transmitted via transmission means wire or not to a computer system (0) linked to the regulation means of printing heads (1a, 10a, 1b, 10b, 1c, 1d). The processing means analyse the corrections to be made to each printing head (1a, 10a, 1b, 10b, 1c, 1d), and controls the regulation means so that position corrections are made automatically as per the alignment information contained in the configuration file.

The present application describes various technical characteristics and advantages in reference to the figures and/or various embodiments. The person skilled in the art will understand that the technical characteristics of a given embodiment can in fact be combined with characteristics of another embodiment unless specified otherwise or that it is evident only that these characteristics are incompatible. Also, the technical characteristics described in a given embodiment can be isolated from the other characteristics of this mode unless specified otherwise.

It must be evident for experts that the present invention enables embodiments in many other specific forms without departing from the field of application of the invention as claimed. Consequently, the present embodiments must be considered by way of illustration, but can be modified in the field defined by the scope of the appended claims, and the invention must not be limited to the details given hereinabove.

The invention claimed is:

1. A method for verification of the alignment of at least one printing head (1a, 10a, 1b, 10b, 1c, 1d) installed on a printing machine, by linear adjustment of at least one group of points (5) represented on an image originating from the digitisation of a model comprising a plurality of printed drops (4), wherein each drop (4) comprises a plurality of points (5), each point (5) having a uniform tint according to a colorimetric database saved in a memory area of a computer system (0) executing the method and comprising at least one memory space, means for acquisition, recording and processing of data, the method comprising:

a. a detection step of the colour of the points (5) by the processing means, followed by attribution by the processing means of spatial coordinates and colorimetric coordinates to each point (5) of a digital image of a model recorded in memory, these coordinates being respectively associated with a spatial coordinate relative to the image and a colorimetric table recorded in a memory space of the computer system (0), b. a creation step, by the processing means, of at least one list of points (5) of the same colorimetric coordinates, the data relative to at least this list being recorded in memory by the data-recording means, c. a creation step, by the processing means, of at least one group of points (5) of the same list of points of the same colorimetric coordinates and whereof each point (5) belonging to said group must be located at a distance less than a distance d/2 from a point (5) of another group, the distance d recorded in memory corresponding to the minimal distance between two groups of points (5), d. a filtering and removal step of groups whereof the number of points (5) is less than a limit value recorded in a memory area of the computer system, e. a vectorization step, by the processing means, of at least one group of points (5), followed by the recording in memory by the recording means of coordinates of at least one corresponding vector (50), f. an association step, via the processing means, of each vector (50) with the corresponding printing head (1a, 10a, 1b, 10b, 1c, 1d), a database connecting each printing head (1a, 10a, 1b, 10b, 1c, 1d) to a colorimetric coordinate being recorded in memory, and g. a comparison step, via the processing means, of coordinates of the vectors (50) with the coordinates of respective optimal vectors recorded in memory and characterising optimal alignment of the heads (1a, 10a, 1b, 10b, 1c, 1d).

2. The method according to claim 1, wherein a point (5) is the smallest element of uniform tint, or pixel, of the image of the recorded model.

3. The method according to claim 1, wherein only the points (5), whereof the colorimetric coordinates are associated via the processing means with a reduced portion of the colorimetric table, are integrated in at least one of the lists created in step b, said reduced portion being recorded in a memory space of the computer system (0).

4. The method according to claim 1, wherein an additional removal step of the points (5) of a drop (4) whereof the number of points (5) is less than a value which can be selected by the user and recorded in memory, is performed via the processing means just prior to step e of the method.

5. The method according to claim 1, wherein the value of the distance d is selected and recorded in memory by a user via input means linked to the computer system (0).

6. The method according to claim 1, wherein the groups of points (5) are vectorized by the processing means as per the method of least squares.

7. The method according to claim 6, wherein each group of points (5) is adjusted by a linear function such that the sum of the squares of the deviations of the coordinates in the direction parallel to the direction of printing (y) of each point (5) relative to the linear adjustment function is minimal.

8. An alignment method of at least one printing head (1a, 10a, 1b, 10b, 1c, 1d) installed on a printing machine, the position of each head (1a, 10a, 1b, 10b, 1c, 1d) able to be adjusted by means of regulation means in a plane parallel to the substrate (2), each head comprising a plurality of nozzles, the printing machine comprising in particular displacement means of the substrate, measuring means (20) of the instantaneous speed of the substrate when moving, computer means (0) for managing printing and alignment operations, the computer means comprising at least one memory area, means for acquisition, recording and processing of data, the method comprising:

a. a creation step (61) by the computer processing means and recording by the recording means in a memory area of the computer system (0), of a digital model usable for alignment of the printing heads (1a, 10a, 1b, 10b, 1c, 1d), b. a printing step (62) of said model with the printing machine on the basis of the model created by the processing means and recorded in memory, the model comprising at least one pattern (40, 41), each pattern being composed of a plurality of printing drops (4), c. a digitisation step (63) of the model printed by the acquisition means controlled by the processing means of the computer system (0), followed by the recording in memory by the recording means of the image of the acquired model, d. a vectorization step (7, 8, 9) of the patterns (40, 41) of the image according to claim 1, the created vectors (50) combining points (5) having in particular the same colorimetric coordinates, and e. a generation step (69) by the processing means and recording by the recording means in a memory area of the computer system (0), of a configuration file of the alignment of at least one printing head (1a, 10a, 1b, 10b, 1c, 1d) performed on the basis of results obtained in the prior step.

9. The alignment method according to claim 8, wherein the printing machine comprises independently of the displacement means, a detection means (3) of the edges of the substrate perpendicular to displacement, so that the processing means triggers the printing of at least one printing head (1a, 10a, 1b, 10b, 1c, 1d) at the opportune moment to perform printing of a model, the instantaneous displacement speed of the substrate being known at each instant and the optimal distance between the detection means (3) and each printing head (1a, 10a, 1b, 10b, 1c, 1d) being recorded in a memory area of the computer system (0).

10. The alignment method according to claim 8, wherein a display step of configuration data of the alignment of at least one printing head (1a, 10a, 1b, 10b, 1c, 1d) is performed parallel to generation of the configuration file, via display means in the computer means (0).

11. The alignment method according to claim 8, wherein the regulation means of the heads (1a, 10a, 1b, 10b, 1c, 1d) modify the position of the heads (1a, 10a, 1b, 10b, 1c, 1d) according to two linear directions respectively perpendicular (x) and parallel (y) to the direction of printing, and according to an angular direction in a plane parallel to the substrate.

12. The alignment method according to claim 8, wherein the printed model comprises on the one hand at least one pattern (40a, 40b, 40c) substantially perpendicular to the direction of printing, each pattern (40a, 40b, 40c) being made by all or some of the nozzles of each printing head, and on the other hand at least one pattern (41a, 41b, 41c) substantially parallel to the direction of printing, each pattern (41a, 41b, 41c) being made by the same nozzle of a printing head (1a, 10a, 1b, 10b, 1c, 1d), the patterns perpendicular to the direction of printing verifying the angular alignment of the heads (1a, 10a, 1b, 10b, 1c, 1d) and alignment of the heads according to the direction parallel to the direction of printing, the patterns parallel to the direction of printing verifying alignment of the heads (1*a*, 10*a*, 1*b*, 10*b*, 1*c*, 1*d*) according to the direction perpendicular to the direction of printing.

13. The alignment method according to claim 8, wherein the data acquisition means comprise an image sensor 2D whereof the resolution is between 0.1 and 100 megapixels.

14. The alignment method according to claim 8, wherein the data acquisition means comprise an image linear sensor fixed on the printing machine and connected to the measuring means of the instantaneous speed (20) of the substrate (2), and whereof the field of vision is at least as wide as the model printed on the substrate (2), said sensor being controlled by the computer means (0) so as to digitise all the patterns (40, 41) printed on the substrate (2), the position of the substrate (2) being known at each instant by the measuring means of the instantaneous speed (20) of said substrate (2).

15. The alignment method according to claim 8, wherein a calibration step by the acquisition and processing means precedes the digitisation step of the model.

16. The alignment method according to claim 8, wherein the data acquisition means comprise an image sensor having a resolution of around 6 megapixels.

17. A method for verification of the alignment of at least one printing head installed on a printing machine, by linear adjustment of at least one group of points represented on an image originating from the digitisation of a model comprising a plurality of printed drops, wherein each drop comprises a plurality of points, each point of the plurality of points having a uniform tint according to a colorimetric database saved in a memory area of a computer system executing the method and comprising a memory, the method comprising:

detecting the colour of the points of the plurality of points and attributing spatial coordinates and colorimetric coordinates to each point of the plurality of points of a digital image of a model recorded in memory, the coordinates being respectively associated with a spatial coordinate relative to the image and a colorimetric table recorded in a memory space of the computer system, creating at least one list of points of the same colorimetric coordinates, the data relative to at least the created list being recorded in memory, creating at least one group of points of the created list of points of the same colorimetric coordinates, each point belonging to said group being located at a distance less than a distance d/2 from a point of another group, the distance d recorded in memory corresponding to the minimal distance between two groups of points, filtering and removing groups having a number of points less than a limit value recorded in memory, vectorizing at least one group of points, followed by recording coordinates of at least one corresponding vector in memory, associating each vector with the corresponding printing head, each printing head being associated with a colorimetric coordinate being recorded in memory, and comparing coordinates of the vectors with the coordinates of respective optimal vectors recorded in memory and characterising optimal alignment of the heads.

\* \* \* \* \*